United States Patent Office 2,836,212
Patented May 27, 1958

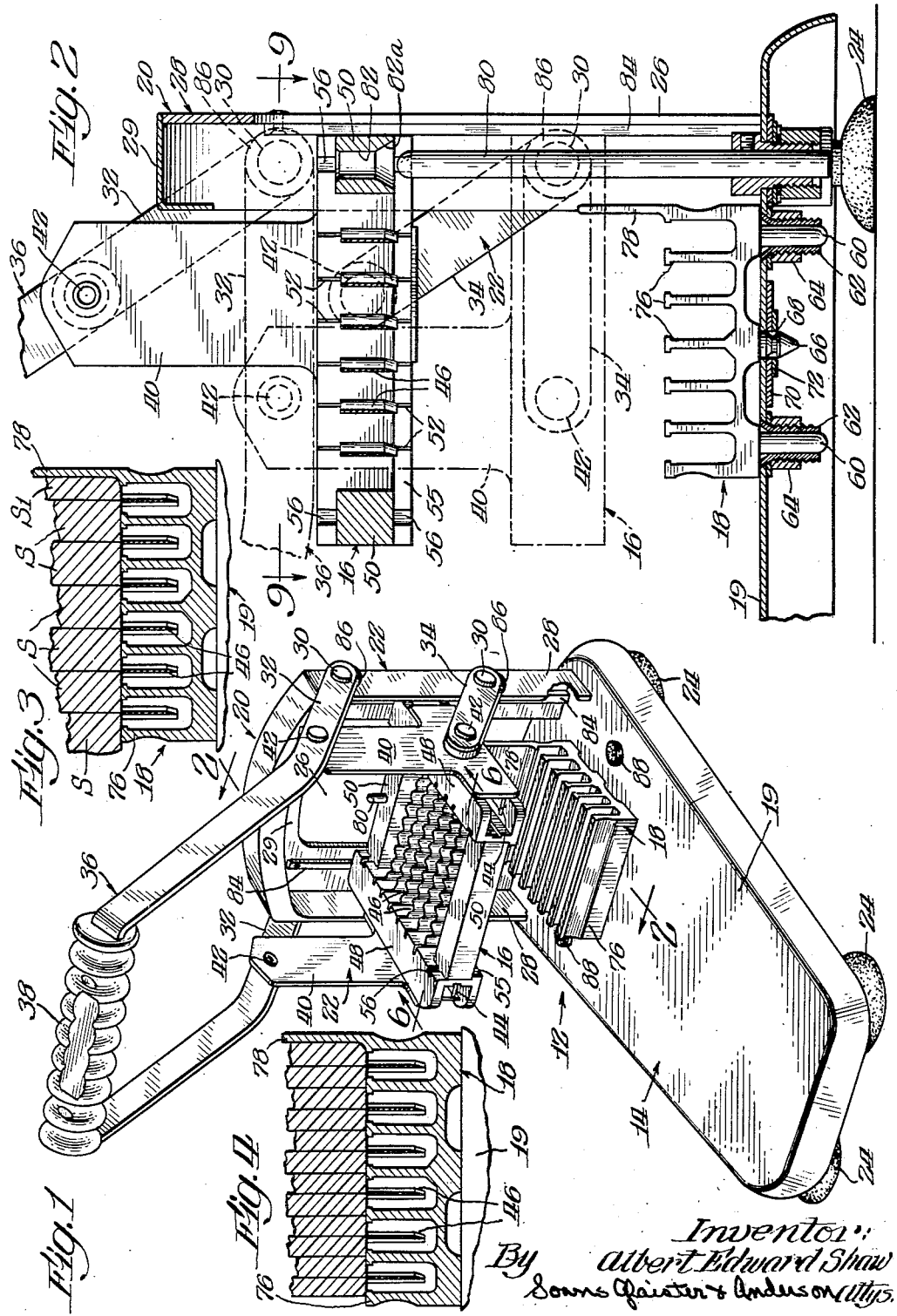

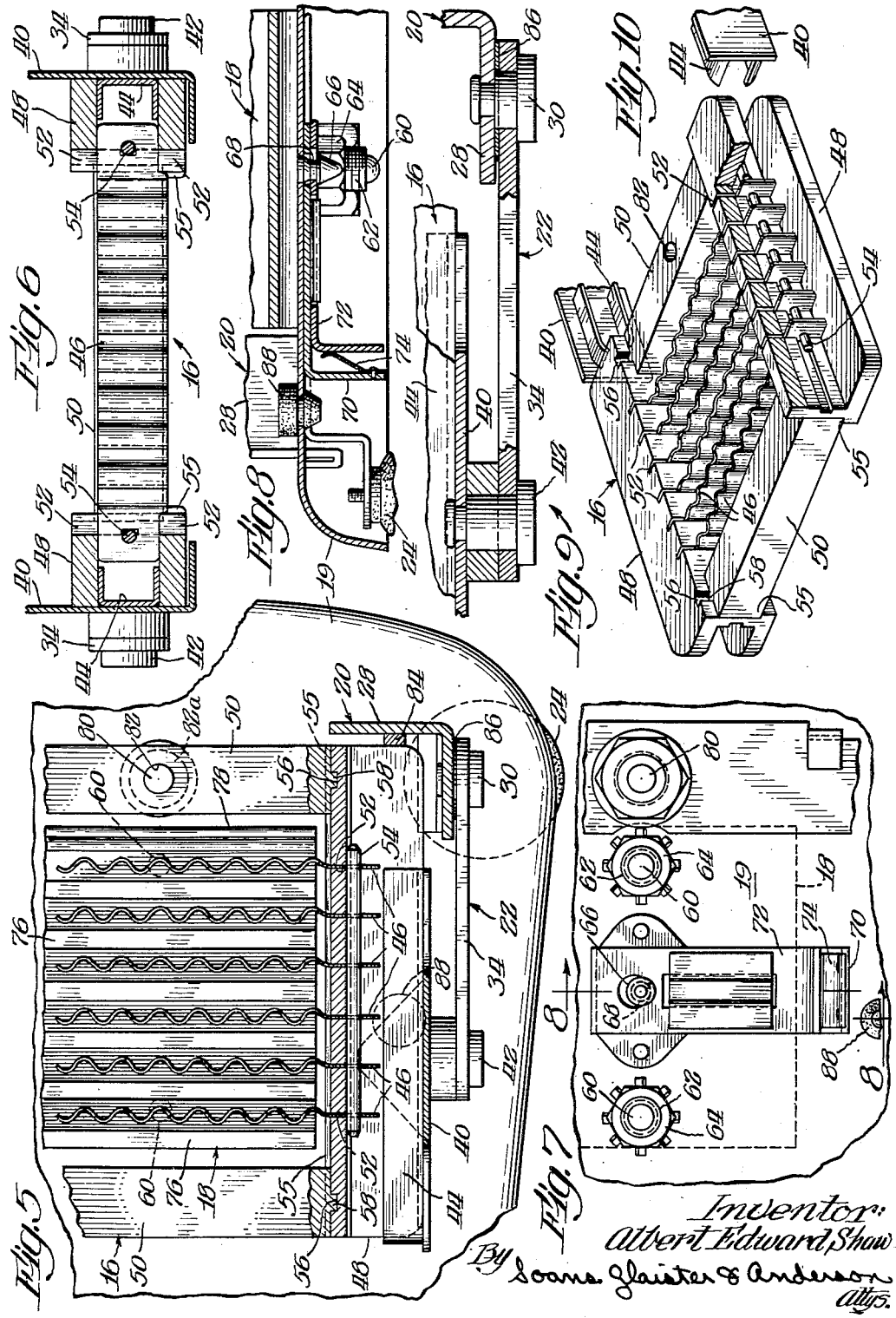

2,836,212

VEGETABLE CUTTER

Albert Edward Shaw, Chicago, Ill.

Application March 1, 1956, Serial No. 568,916

7 Claims. (Cl. 146—160)

This application relates generally to vegetable cutters and the like, and is more particularly directed to an improved form of machine for slicing potatoes and other foodstuffs.

In the slicing of potatoes and the like, it is desirable, of course, that the slices be uniform in thickness and that the slicing be achieved with a minimum of effort. It is also very convenient to be able to adjust the thickness of the slices and to make various types of cuts such as cubes or elongated strips. Then too, it is desirable that a vegetable cutter be durable, particularly the blade portion thereof, and that it be capable of being easily disassembled for cleaning.

It is the primary object of the present invention to provide an improved form of vegetable cutter, which affords easy cutting of a potato or the like into uniformly thick portions. A further object of the invention is to provide a cutter affording a selection as to the size and shape of the cut which may be made, without requiring the substitution or exchange of parts or adjustment of the position of the existing parts in order to achieve the selected type of cut. Still another object is to provide cutter blades which are mounted in an improved manner so as to resist those forces exerted on the blades by the article being cut and which otherwise tend to distort or flex the blades and cause the slices or other types of cuts being made to vary in thickness. Other objects and advantages will become apparent as the disclosure progresses with respect to the accompanying drawings, wherein:

Figure 1 is a perspective view of a machine embodying the present invention;

Figure 2 is an enlarged sectional view taken along the line 2—2 in Figure 1, with the cutter blades shown in their elevated position by full lines and in an intermediate position by broken lines;

Figure 3 is an enlarged cross-sectional view of the cutter blades, shown in their lowermost position after having made a cut through a potato;

Figure 4 is a view similar to Figure 3, illustrating the use of the cutter to produce slices one-half the thickness of those shown in Figure 3;

Figure 5 is an enlarged fragmentary view of the cutter, with parts broken away and in section;

Figure 6 is an enlarged sectional view taken along the line 6—6 of Figure 1;

Figure 7 is an enlarged fragmentary bottom plan view of the cutter;

Figure 8 is a sectional view taken along the line 8—8 in Figure 7;

Figure 9 is an enlarged sectional view of the operating linkage for the cutter, taken along the line 9—9 in Figure 2; and Figure 10 is a perspective view of the cutter blade assembly in position for mounting on the cutter, with portions broken away to more clearly illustrate certain details of construction.

Although the present invention is useful in cutting many different items, it is particularly adapted for, and will be described with respect to, the cutting of potatoes. The latter is the most common usage of machine of this type and presents the most rigid requirements with respect to the proper operation of such machines.

As seen generally in Figure 1, apparatus embodying the present invention is shown in the form of a vegetable cutter 12 including a frame structure 14, a cutter blade assembly 16 and a vegetable supporting block 18. The frame 14 includes a base portion 19, which supports the vegetable block 18 in removable relation thereto, and a vertically extending structure 20 which supports the cutter blade assembly 16, through means of a pantograph mechanism 22, for vertical movement relative to vegetable block 18. The cutter blade assembly 16 is supported by the pantograph mechanism 22 is a manner affording relative sliding movement therebetween, and a guide means is provided on the frame structure 14 for guiding and restraining the blade assembly so that it moves only in a vertical direction with respect to the vegetable block 18.

With reference also to Figure 2, it is seen that the base portion 19 of the cutter frame is a table formed of metal or the like having a suction cup 24 at each of the four corners for retaining the table in position on a flat surface. The vertical portion 20 of the frame 14 is preferably in the form of a metal plate having an opening 26 through its mid portion and being bent at its opposite edges to present a pair of spaced-apart angular corner posts 28. The portion of the metal plate above the opening 26 forms a transverse member 29 which extends between and interconnects the upper ends of the posts 28.

Opposite side portions of the vertical frame structure 20 form a pair of fixed links in the pantograph mechanism 22. More particularly, there is provided along each of the corner posts 28 a pivot support, such as a pin 30, for one end of each of a pair of vertically spaced apart links 32 and 34 of equal length. The upper link 32 at each side of the cutter preferably comprises an end portion of a generally U-shaped strap member 36, with the bight portion of the member 36 mounting a handle 38 for operating the cutter. Completing the pantograph at each side of the frame portion 20 is an inverted T-shaped plate member 40, which is pivotally interconnected between the links 32 and 34 by means of pins 42 which are spaced apart at a distance equal to the spacing of the pins 30 on post 28.

The bottom or cross portion of each of the T-shaped frame members includes a horizontally extending guide member in the form of a channel 44 (Figures 6 and 10), and these guide members are adapted to slidably receive the cutter blade assembly 16 when the pantograph 22 is in its uppermost position, as will be described later.

The cutter blade assembly 16 includes a plurality of knives 46 which are disposed between a pair of end supports 48 and held under tension in fixed relation thereto by means of a pair of blocks 50. The end supports 48 are in the form of channel members which are adapted to be slidably received by the guide members 44, carried by the lower end of the T-shaped members 40.

The cutter blades or knives 46 are, of course, one of the principal components of any vegetable cutter and determine largely the efficiency and durability of such cutter. In the disclosed structure, there is provided a novel arrangement for these cutter blades which places them under a sufficient amount of tension, to hold the blades rigidly in place so as to resist the normal tendency to deflect when passing through a potato or the like.

More particularly, the blades 46 are of corrugated shape and are made of tempered, cutlery grade stainless steel. To form the cutter blade assembly, the blades are first positioned in parallel relationship with their opposite ends extending through slots 52 formed in the end supporting members 48, and a pin 54 is then passed through aligned openings in the ends of the knife blades. The blades are generally alike so that the corrugations in the several blades are in alignment. The end members 48 are then subjected to considerable forces in a direction thereon tending to separate the end members. The blocks 50 which are of predetermined length are then put into position between the end members 48 as shown particularly in Figure 10, while the blades are under a greater tension than that required in the final assembly, in order to retain the required amount of tension on the blades after the applied force is removed. The actual final tension imposed on the blades 46 will be determined to some extent by the character and shape of the blades. The tension should be of a magnitude such that it will sufficiently stress the blades to prevent any flexing or distorting of the blades during their cutting operation. In this way, a perfectly plane cut is achieved and uniformly thick slices result from the action of the cutter assembly.

In this respect, satisfactory results have been attained with a cutter blade assembly consisting of six knives of corrugated shape, as illustrated, wherein each blade was 3.75 inches long and 0.625 inch in depth. The blades were of cutlery grade stainless steel and were about 0.029 inch thick at their upper edge and the lower 7/64 inch of each blade was beveled or tapered to a thickness of about 0.002 inch. The end members 48 and the blocks 50 were of a heat treated aluminum alloy. With this construction, the blades were initially exposed to a total tension of about 8000 pounds by means of a hydraulic cylinder acting against the blade-supporting members 48, and this tension was preserved to an extent of at least 6000 pounds after the blocks 50 were inserted and the hydraulic press removed from the cutter assembly. Thus, each blade was retained under a very substantial tension of about 1000 pounds.

In order to insure proper placement of the blocks 50 at opposite sides of the group of knives 46, there is preferably provided means for mortising the ends of the blocks in the knife blade supporting members 48. In this way, the compressive forces on the blocks 50 are axial and uniformly distributed. In the illustrated structure, the placement of the blocks 50 relative to the members 48 is achieved through the provision of an inwardly projecting ledge 55 (Figure 10) and a pair of vertically extending grooves 56 in each of the members 48. Each end of the blocks 50 includes a rib 58 (Figure 5) for engaging one of the grooves 56 in the member 48.

The vegetable supporting block 18, which is disposed on the base 19 in position to receive the cutter blades, is preferably removably attached to the base in order to facilitate cleaning the block. More particularly, the lower surface of the block 18 includes a pair of downwardly extending, spaced-apart pins 60 (Figure 2), and these pins are inserted in openings defined by a pair of tubular inserts 62 which are externally threaded and held in place on the bottom of the base by means of nuts 64. The block 18 also includes a latch pin 66 projecting from its lower surface and which is tapered at its outer end and includes an annular recess 68 along an intermediate portion thereof which extends below the base 19. The bottom side of the cutter base 19 is provided with a latch means, seen particularly in Figures 7 and 8, which coacts with the latch pin 66 to maintain the block 18 in position. This latch means includes a pair of L-shaped members 70 and 72 having alignable openings adjacent one end of the L-shaped members. A spring means 74 is fixed to one of these members in position for biasing the lowermost member away from the other to a position of partial alignment between the openings therein. As the pin 66 is inserted through the opening in the table and in the opening in the upper member 70, the tapered end of the pin 66 forces the lowermost latch member 72 laterally, in opposition to the spring biasing means 74, to a position of alignment of the latch pin receiving openings. Continued downward movement of the latch pin 66 brings the annular recess 68 in the pin opposite the edge of the openings in the members 70 and 72, wherein the spring 74 urges the lowermost member 72 to a position locking the pin 66 and thereby the block 18 in place on the cutter base, as seen in Figures 7 and 8. The latch may be released by pressing the downward leg portion of the member 72 against the spring 74 to again effect an alignment of the latch pin receiving openings. Thus, it is seen that the vegetable support block is readily removable for cleaning.

As noted in the drawings, the upper surface of the block 18 includes a plurality of vertically extending rib portions 76 which are of proper spacing and depth to receive one of the knife blades 46 mid-way between each pair of adjoining ribs. The inner end of the block 18, that is, the end adjacent the vertical frame structure 20, also includes an upwardly extending plate portion 78 which serves a very advantageous purpose. This plate portion is preferably disposed so that the side thereof facing the ribs 76 is a predetermined distance from the center line of the immediately adjacent groove defined by the ribs 76. In this way, the plate portion 78 serves as a guide for the article to be cut and determines the position of the cuts taken through such article. Looking particularly to Figures 3 and 4, it is seen that this plate portion is particularly effective in producing slices of reduced thicknesses. Having made one cut through a potato or the like, in the manner seen in Figure 3, the thickness of the slices S can be further reduced by removing the end slice, indicated as $S_1$, pressing the potato into contact with the plate portion 78, and again passing the knives through the potato to produce the additional slices illustrated in Figure 4.

A further feature of construction in the disclosed device is in connection with the particular movement provided for the cutter blade assembly 16. In order to assure that there is only vertical movement of the knife blades relative to the block, there is provided a center guide post 80, which is adapted to engage a center opening 82 in the adjacent block 50 as the blade assembly is initially moved downward through movement of the handle 38. The guide post 80 is preferably rounded at its upper end, and the lower portion 82a of the guide opening 82 is tapered to insure proper registry of the guide rod with the opening. In addition, rotation of the cutter blade assembly 16 about the guide post 80 is prevented by fixedly positioning a pair of bars 84 (Figures 1 and 2) on opposite sides of the frame structure 20 in position for sliding engagement with the adjacent ends of the guide channels 48 which mount the knife blades.

To position the cutter blade assembly in the vegetable cutter, the handle 38 is first moved to its uppermost position. At this point, the channel guide members 44 are located adjacent the upper ends of the corner posts 28, in contact with guide bars 84 and just above the top of the guide rod 80. The cutter blade assembly 16 is then positioned on the pantograph mechanism 22 by sliding the blade supporting channels 48 onto the channel guide members 44 carried by the parallel linkage, as seen in Figure 10. To facilitate the initial interengagement of the blade supporting channels 48 onto the channel guide members 44, the outer ends of the channel members 44 may curve inwardly as shown in Figure 10. The blade assembly is moved to a position of engagement with the side guide bars 84, and the handle is then moved downwardly to effect engagement between the guide opening 82 in the end of the cutter blade assembly and the guide rod 80. The elevation of the blade assembly above the vegetable supporting block 18, at the time of engagement between the guide opening 82 and the guide rod 80, is preferably sufficient to permit the insertion of a large potato or the like therebetween.

It will be noted from the described construction that, as the pantograph type of support for the cutter blade assembly 16 is moved vertically with respect to the base 14, the guide channels 44 on the T-shaped frame members 40 slide longitudinally of the channels 48 which hold the knives 46. The cutter blade assembly 16 is, of course, restrained against any movement other than in a direction normal to the vegetable support block 18 by the above-described means including the guide post 80 and the guide bars 84.

It is also desirable that the blade assembly 16 be prevented from movement other than that intentionally provided by movement of the handle 38. In order to accomplish this, one or more of the pivot means 30 and 42 for the links 32 and 34 is provided with a spring washer 86 (Figure 9) which serves to hold the associated link and the entire linkage in any selected position. There is also preferably provided a pair of rubber pads 88 (Figure 1) or the like, which are disposed in position on the base 19 to cushion the final downward motion of the cutter blade assembly.

In operation, the potato or similar article is placed on the block 18 with a portion thereof engaging the plate portion 78 of the block. The handle 38 is then moved downwardly to effect a passage of the knife blades 46 through the potato and into the recesses provided in the block 18 by the vertically extending ribs 76. If thinner slices are desired, the innermost slice $S_1$, as seen in Figure 3, is removed and the potato moved toward the plate 78 so that the cuts S which are already made rest on the upper edges of the ribs 76. An additional passage of the blade assembly through the potato causes the knives to pass mid-way between the previous cuts and thereby reduces the thickness of the slice by one-half. It will be apparent that other shapes can also be achieved by moving the potato around on the block 18, in order to have the knives pass through the potato at an angle with respect to the previously made cuts.

In the described embodiment, the knife blades are shown as being corrugated. This is believed advantageous in that it provides more surface area for each slice and thereby makes it possible to fry or otherwise cook the slices at a faster rate. Obviously, these blades may be straight if desired.

It is seen, therefore, that there is provided a vegetable cutter which is designed particularly to provide uniform thickness of cuts between a plurality of blades, due particularly to a novel arrangement affording greater resistance of the knife blades to bending. Apparatus embodying the present invention is also advantageous in that it is readily disassembled for cleaning and that it permits a variety of types of cuts to be made without changing the cutter blade assembly or the position thereof. It also offers easier cutting in that the pantograph type of action used for movement of the knife assembly affords a substantial mechanical advantage, whereby the force of the knives on the potato is several times greater than that exerted by the operator on the handle.

Although shown and described with respect to particular apparatus, it will be readily apparent that other modifications might be made without departing from the principles of this invention.

I claim:

1. A vegetable cutter comprising a supporting frame structure, a cutter assembly including a vegetable supporting block and a knife blade unit which are mounted on said frame structure, means carried by said frame structure to afford relative movement between said supporting block and said knife blade unit, said means comprising a pantograph linkage system pivotally mounted on said frame structure, said linkage system including a force transmitting member movable toward and away from said supporting block, said knife blade unit being slidably supported by said force transmitting member in a direction generally parallel to the upper surface of said supporting block, and guide means attached to said frame structure slidably engaging said knife blade unit during movement relative to said supporting block for restricting movement of said knife blade unit to a direction along an axis generally normal to the upper surface of said supporting block.

2. A vegetable cutter comprising a frame having a base portion and a vertical portion which extends upwardly from one end of said base portion, a vegetable supporting block secured to the upper surface of said base portion and including a plurality of upwardly facing grooves, a horizontally extending cutter unit vertically aligned with respect to said supporting block and including a plurality of knife blades which are in alignment with the grooves in said supporting block, a pantograph mechanism formed by the vertical portion of said frame and interconnecting movable link means, said interconnecting link means including a force transmitting member movable toward and away from said supporting block, said cutter unit being slidably supported by said force transmitting member, and vertically extending guide means attached to said frame structure slidably engaging said cutter unit for restricting said cutter unit to movement in a vertical direction during movement of said force transmitting member from an uppermost position where said cutter unit is spaced from said supporting block to a lower position wherein the knife blades of said cutter unit are recessed within the grooves of said supporting block.

3. A vegetable cutter comprising a frame structure having a base portion and a portion which extends generally at a right angle to said base portion, a vegetable supporting block secured to said base portion and including a plurality of upwardly facing grooves, a cutter unit including a plurality of knife blades adapted for alignment with the grooves in said supporting block, a pantograph mechanism formed by the portion of said frame structure extending from said base portion and by movable link means pivotally connected to said extending frame portion, said link means including a force transmitting member movable toward and away from said supporting block, said cutter unit being slidably supported by said force transmitting member in a direction generally parallel to the upper surface of said supporting block, and guide means attached to said frame structure slidably engaging said cutter unit for restricting said cutter unit to movement in a direction generally normal to the upper surface of said supporting block during movement of said force transmitting member from an uppermost position where said cutter unit is spaced from said supporting block to a lower position wherein the knife blades of said cutter unit are recessed within the grooves of said supporting block.

4. A vegetable cutter comprising a frame structure including a base portion and a portion extending generally vertically from said base portion, a vegetable supporting block detachably secured to said base portion, a cutter unit supported by said vertically extending frame portion in vertical alignment with said supporting block, said cutter unit comprising a plurality of knife blades fixed at their opposite ends to a pair of generally parallel channel members, said knife blades being maintained under a substantial amount of tension by means of a pair of compression members extending between said channel members along opposite sides of said knife blades, pantograph means connecting said vertically extending frame portion and said cutter unit for affording movement of the cutter unit toward and from said vegetable supporting block, said connecting means including a force transmitting member slidably engaging the channel members of said cutter unit and positioning said cutter unit in a generally horizontal direction, and vertically extending guide means secured to said base portion of said frame and slidably engaging said cutter unit for restricting movement of said cutter unit to the vertical direction during movement of said force transmitting member relative to said supporting block.

5. A vegetable cutter comprising a frame structure having a base portion and a portion which extends generally at a right angle to said base portion, a vegetable supporting block secured to said base portion and including a plurality of grooves extending into the upper surface thereof, a guide plate associated with said supporting block and positioned at one end thereof at a right angle with respect to said upper surface, a cutter unit including a plurality of knife blades in alignment with the grooves in said supporting block, a pantograph mechanism formed by the upwardly extending frame portion and by movable link means pivotally connected to said upwardly extending frame portion, said link means including a force transmitting member movable toward and from said supporting block, said cutter unit being slidably supported by said force transmitting member in a direction generally parallel to the upper surface of said supporting block, and guide means secured to said frame slidably engaging said cutter unit for restricting said cutter unit movement in a direction generally normal to the upper surface of said supporting block during movement of said force transmitting member relative to said supporting block, said guide plate being disposed so that the paths of said knife blades of said cutter unit are predetermined distances from and parallel to the facing surface of said guide plate.

6. A vegetable cutter comprising a supporting frame structure, a cutter assembly including a vegetable supporting block and a knife blade unit which are mounted on said frame structure, said knife blade unit comprising a plurality of generally parallel knife blades of corrugated shape, a pair of supporting end members secured to opposite end portions of said blades, and a pair of compression members disposed between said end members at opposite sides of said blades and holding said blades under tension, said compression members having a length measured between said end members greater than the length measured between said end members of said blades when said blades are not under tension to thereby space said end members so as to maintain said blades under tension and to thereby hold said end members and said compression members in fixed position relative to one another, means carried by said frame structure to afford relative movement between said supporting block and said knife blade unit, said means comprising a pantograph linkage system pivotally mounted on said frame structure, said linkage system including a force transmitting member movable toward and away from said supporting block, said knife blade unit being slidably supported by said force transmitting member in a direction generally parallel to the upper surface of said supporting block, and guide means attached to said frame structure slidably engaging said knife blade unit during movement of the knife blade unit relative to said supporting block for restricting movement of said knife blade unit to a direction along an axis generally normal to the upper surface of said supporting block.

7. A cutter blade assembly for use in cutting slices of vegetables and the like, comprising a plurality of generally parallel corrugated knife blades, a pair of supporting end members secured to opposite end portions of said knife blades, and a pair of compression members disposed between said end members at opposite sides of said knife blades and holding said blades under tension, said compression members having a length measured between said end members greater than the length measured between said end members of said knife blades when said knife blades are not under tension, thereby spacing said end members so as to maintain said knife blades under tension and to thereby hold said end members and said compression members in fixed position relative to one another and to prevent the flexing of said blades during use.

References Cited in the file of this patent

UNITED STATES PATENTS

| | | |
|---|---|---|
| 507,383 | O'Connell | Oct. 24, 1893 |
| 1,338,656 | Sharp | Apr. 27, 1910 |
| 1,057,159 | Madsen | Mar. 25, 1913 |
| 1,183,756 | Nielsen | May 16, 1916 |
| 1,865,986 | White | July 5, 1932 |
| 2,303,595 | Young | Dec. 1, 1942 |
| 2,465,266 | Rieder | Mar. 22, 1949 |
| 2,581,501 | Shaver | Jan. 8, 1952 |
| 2,682,901 | Morris | July 6, 1954 |
| 2,693,027 | Myer | Nov. 2, 1954 |

FOREIGN PATENTS

| | | |
|---|---|---|
| 51,615 | Switzerland | Nov. 24, 1910 |
| 379,098 | Great Britain | Aug. 25, 1932 |